United States Patent [19]
Banville et al.

[11] Patent Number: 6,019,853
[45] Date of Patent: Feb. 1, 2000

[54] APPARATUS AND METHOD FOR CLEANING THE MAGNETIC CIRCUIT OF A STATOR OF A TURBINE-ALTERNATOR GROUP

[75] Inventors: Jean-Pierre Banville, Baie Comeau; Louis Marcel Tremblay, Pointe-Lebel; Emilio Levesque; Claude Desjardins, both of Baie Comeau, all of Canada

[73] Assignee: Hydro-Quebec, Montreal, Canada

[21] Appl. No.: 09/016,277

[22] Filed: Jan. 30, 1998

Related U.S. Application Data

[60] Provisional application No. 60/037,259, Jan. 31, 1997.

[51] Int. Cl.[7] .................................. B08B 3/02; B08B 1/04
[52] U.S. Cl. .................................. 134/6; 15/246; 310/273
[58] Field of Search .................................. 15/246, 246.5; 134/6; 310/273

[56] References Cited

U.S. PATENT DOCUMENTS 1,293,193   2/1919   Poyas ..................................... 15/246 X
1,781,551   11/1930  Mataya .................................. 15/246 X

FOREIGN PATENT DOCUMENTS 97452   2/1961   Netherlands .......................... 15/246.5

*Primary Examiner*—Mark Spisich
*Attorney, Agent, or Firm*—Foley & Lardner

[57] ABSTRACT

The apparatus is used to clean a stator portion facing a rotor with removable peripheral poles in a turbine-alternator group. The apparatus has an elongated frame, adapted to replace one of the poles of the rotor by means of attachments devised for this purpose. An elongated brushing element extends generally in parallel with respect to the stator portion to be cleaned. Positioning devices are mounted between the frame and the brushing element to position the brushing element so that it comes in contact with the stator portion to be cleaned during the operation of the apparatus. A driving motor is coupled to the brushing element, and injectors are mounted onto the frame to inject a solvent under pressure on the stator portion to be cleaned when the apparatus is in operation. The method consists to turn slowly the rotor equipped with the apparatus to clean the stator portion.

13 Claims, 5 Drawing Sheets

APPARATUS AND METHOD FOR CLEANING THE MAGNETIC CIRCUIT OF A STATOR OF A TURBINE-ALTERNATOR GROUP

CROSS REFERENCE TO RELATED APPLICATION

This application claims the benefit of U.S. Provisional Application Ser. No. 60/037,259 filed on Jan. 31, 1997.

FIELD OF THE INVENTION

The invention relates in general to the cleaning of the magnetic circuit of a stator of a turbine-alternator group, and more particularly to an apparatus especially designed for this purpose and a method of cleaning using the apparatus.

BACKGROUND

The stators and rotors of turbine-alternator groups like those found in hydroelectric dams can become soaked with oil and carbon. A clogged stator is synonymous of a temperature increase, which in certain cases, causes production limitations. Moreover, when the alternator is very dirty, there is a degradation of the insulating paints, thereby reducing the useful life of the winding.

A cleaning is highly desirable to ensure the reliability of the equipment, to prevent the degradation of the windings, to extend the lifetime of the alternator, to influence the rate of forced stops and the rate of unavailability of the groups, and to reduce the temperature of the stator windings (by the cleaning of the ventilation channels, the temperature drop causing a reduction of the copper losses at the rotor and the stator).

However, hitherto, the rotor must be removed from the alternator to then proceed with the cleaning of the stator using classical methods (e.g. manual cleaning using cloths and brushes), operation which is expensive, more or less safe and which causes a 12- to 16-week forced stop of the turbine-alternator group subjected to the cleaning. Because of this, the cleaning operations are often deferred due to the lengthy period of the unavailability of the turbine-alternator groups.

SUMMARY

An object of the present invention is to provide an apparatus adapted to the cleaning of the stator of a turbine-alternator group without requiring the removal of the rotor in place.

Another object of the present invention is to provide such an apparatus and a method of cleaning using the apparatus, which is less expensive, more cost effective, and safer compared to prior art methods.

Another object of the present invention is to provide such an apparatus, which is easy to install and which permits to achieve the cleaning of the stator of an turbine-alternator group more rapidly than with prior art methods.

The cleaning apparatus according to the present invention comprises: an elongated frame, adapted to replace one of the poles of the rotor; fastening means for fastening the frame onto the rotor in place of said one of the poles of the rotor; an elongated brushing element, extending generally in parallel with respect to the stator portion to be cleaned when the frame is mounted onto the rotor; positioning means mounted between the frame and the brushing element, for positioning the brushing element with respect to the frame so that the brushing element comes in contact with the stator portion to be cleaned when the frame is mounted onto the rotor; a driving motor coupled to the brushing element; and injection means for injecting a fluid under pressure on the stator portion to be cleaned when the frame is mounted onto the rotor.

The method of cleaning according to the invention consists of: a) substituting at the place of a pole of the rotor, a cleaning apparatus comprising: an elongated frame, adapted to replace said pole of the rotor; fastening means for fastening the frame on the rotor in place of said pole of the rotor; an elongated brushing element, extending generally in parallel with respect to the stator portion to be cleaned when the frame is mounted onto the rotor; positioning means mounted between the frame and the brushing element, for positioning the brushing element with respect to the frame so that the brushing element comes in contact with the stator portion to be cleaned when the frame is mounted onto the rotor; a driving motor coupled to the brushing means; and injection means for injecting a fluid under pressure on the stator portion to be cleaned when the frame is mounted onto the rotor; b) activating the motor, supplying the injection means with a fluid under pressure; and c) turning slowly the rotor so that the rotor makes at least one complete revolution.

BRIEF DESCRIPTION OF THE DRAWINGS

A detailed description of preferred embodiments of the invention will be given hereinbelow with reference to the following drawings, in which like numbers refer to like elements.

DETAILED DESCRIPTION OF PREFERRED EMBODIMENTS

Figure 1:
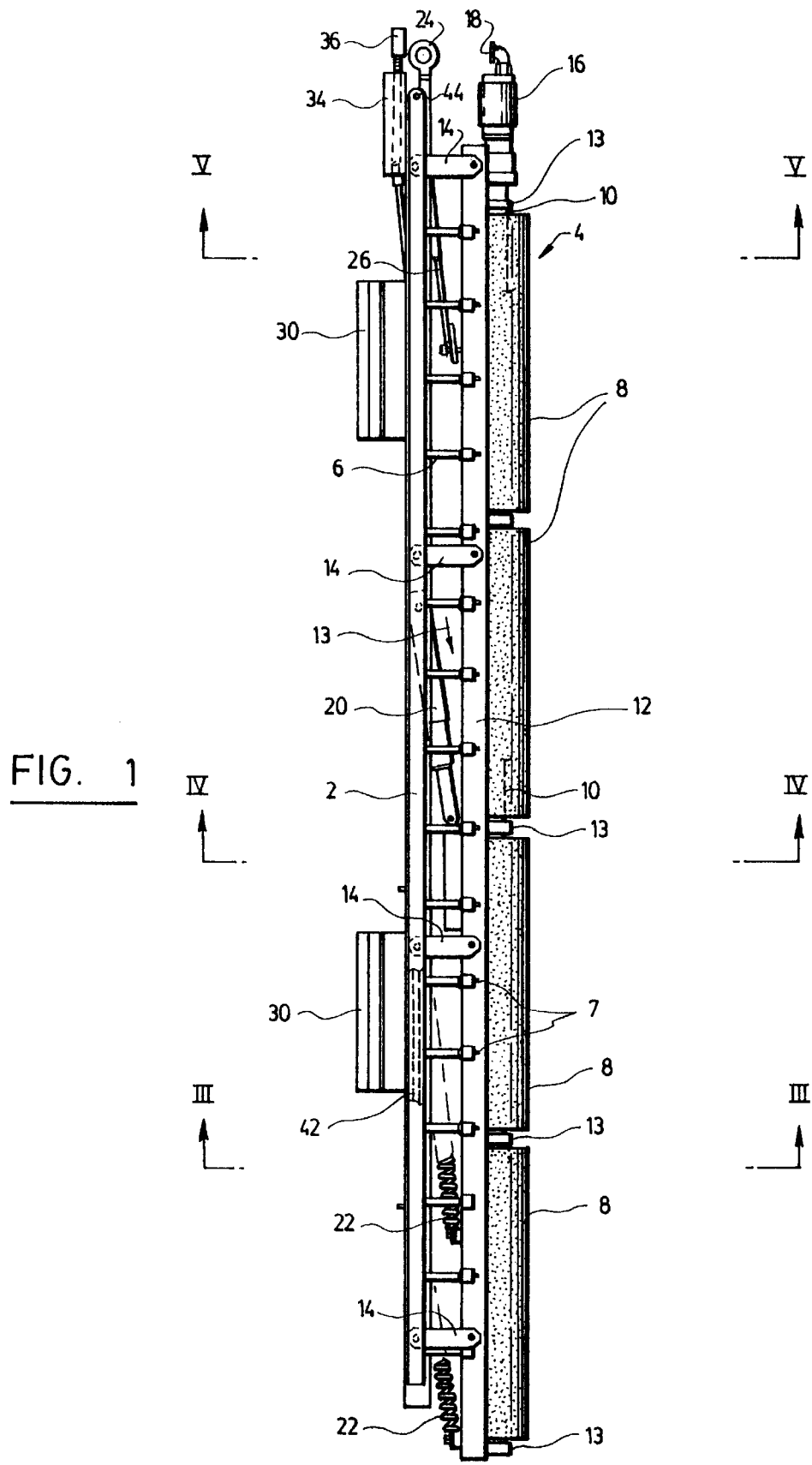
FIG. 1 is an elevation view of the apparatus according to the invention.
Figure 2:
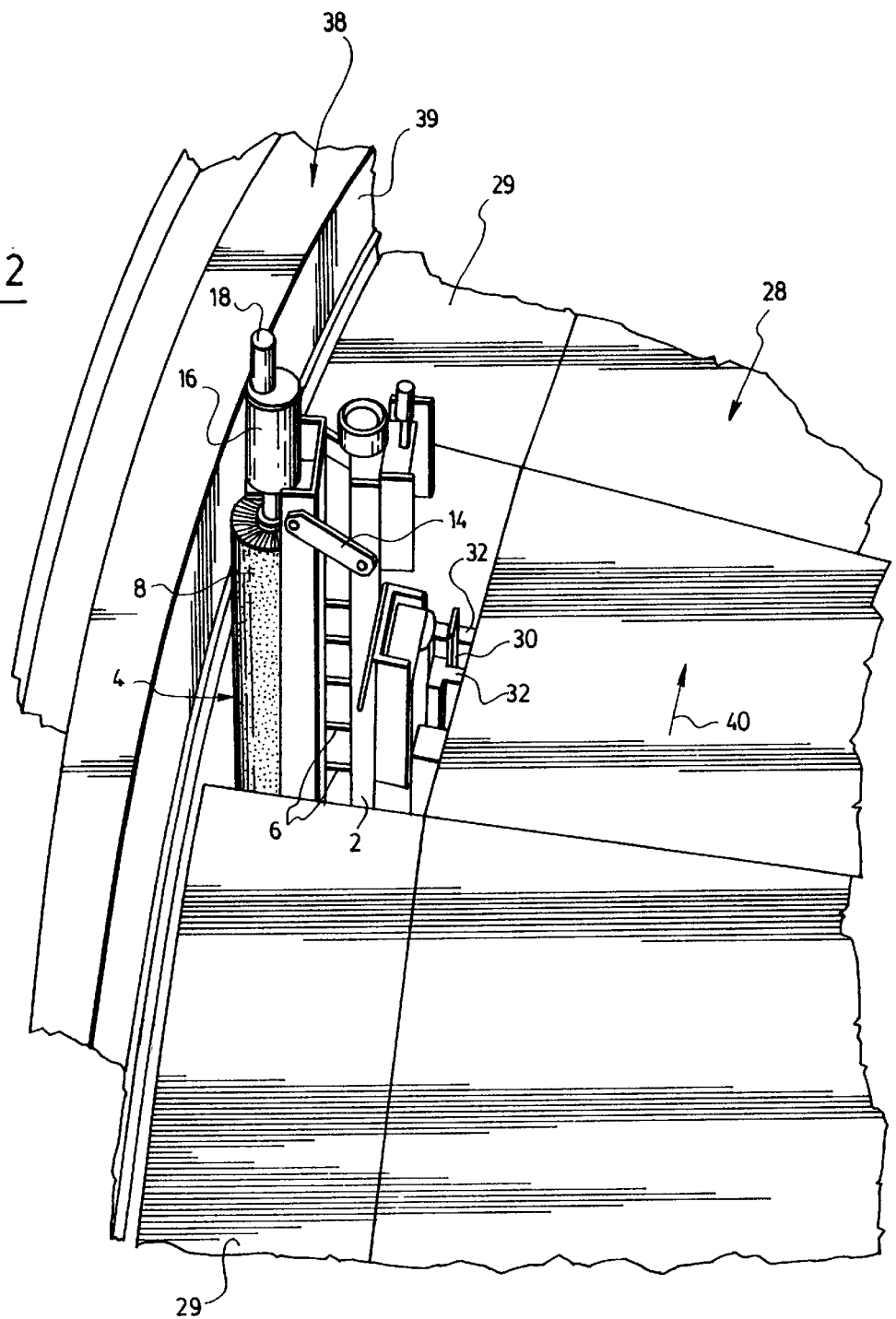
FIG. 2 is a perspective view on one side of the apparatus according to the invention, mounted onto a rotor and in operation.

Referring to FIG. 1, there is shown a cleaning apparatus according to the invention. The apparatus is used to clean a portion 39 of a stator 38 facing a rotor 28 with removable peripheral poles 29 in a turbine-alternator group, as shown in FIG. 2. The concerned portion 39 of the stator 38 is generally formed by the magnetic circuit of the stator 38.

The apparatus comprises an elongated frame 2 supporting a longitudinal long rotary brush 4 accompanied with a series of solvent injectors 6 affixed to the frame 2 and directed next to the brush 4, to inject the solvent on the portion 39 of the stator 38 to be cleaned. The shape and dimensions of the frame 2 do not matter much, insofar as they suit to that the frame 2 be adapted to replace one of the poles 29 of the rotor 28 as illustrated in FIG. 2.

Figure 3:
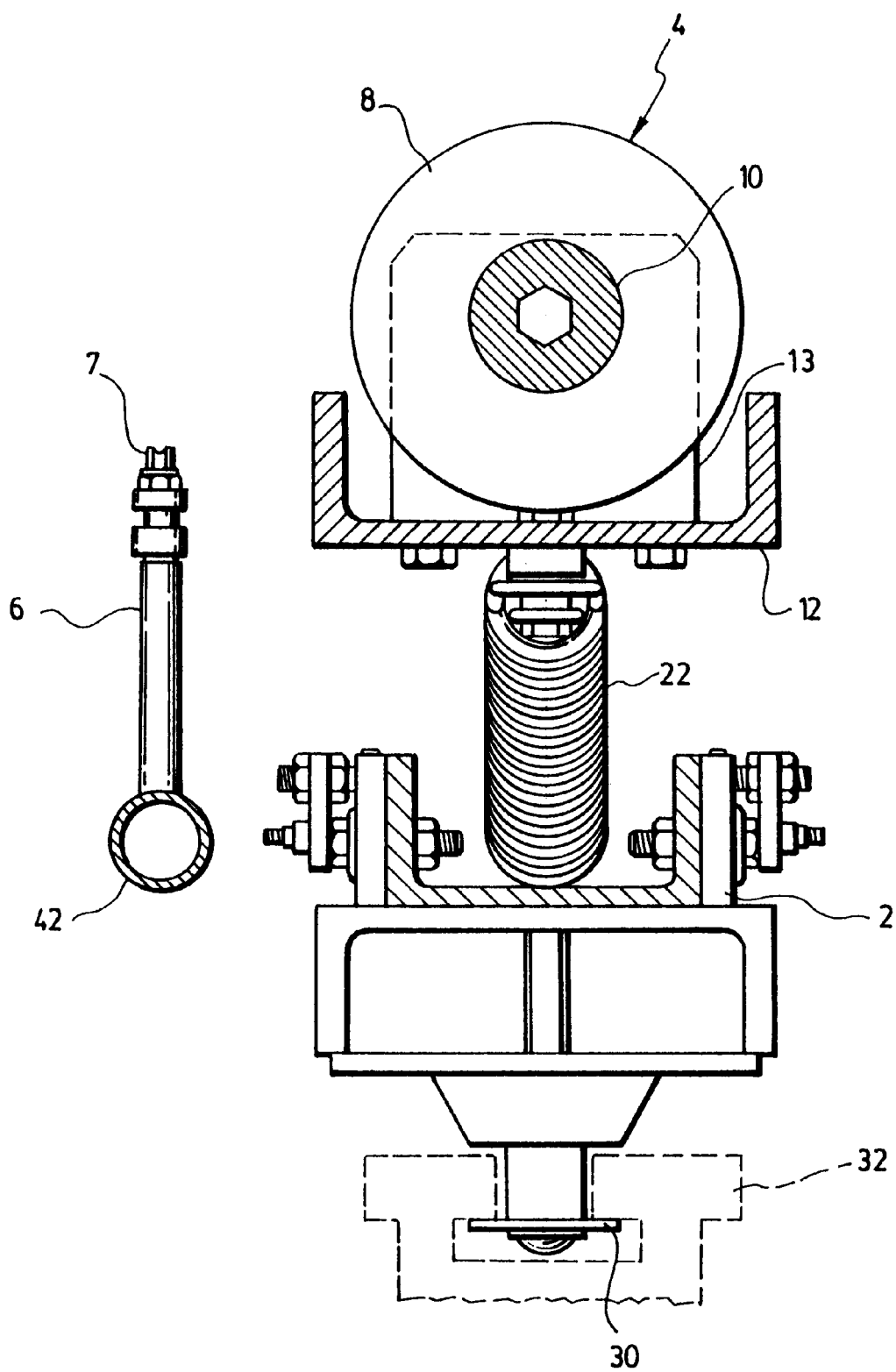
FIG. 3 is a cross-section view along the lines 3—3 of the apparatus illustrated in FIG. 1.
Figure 4:
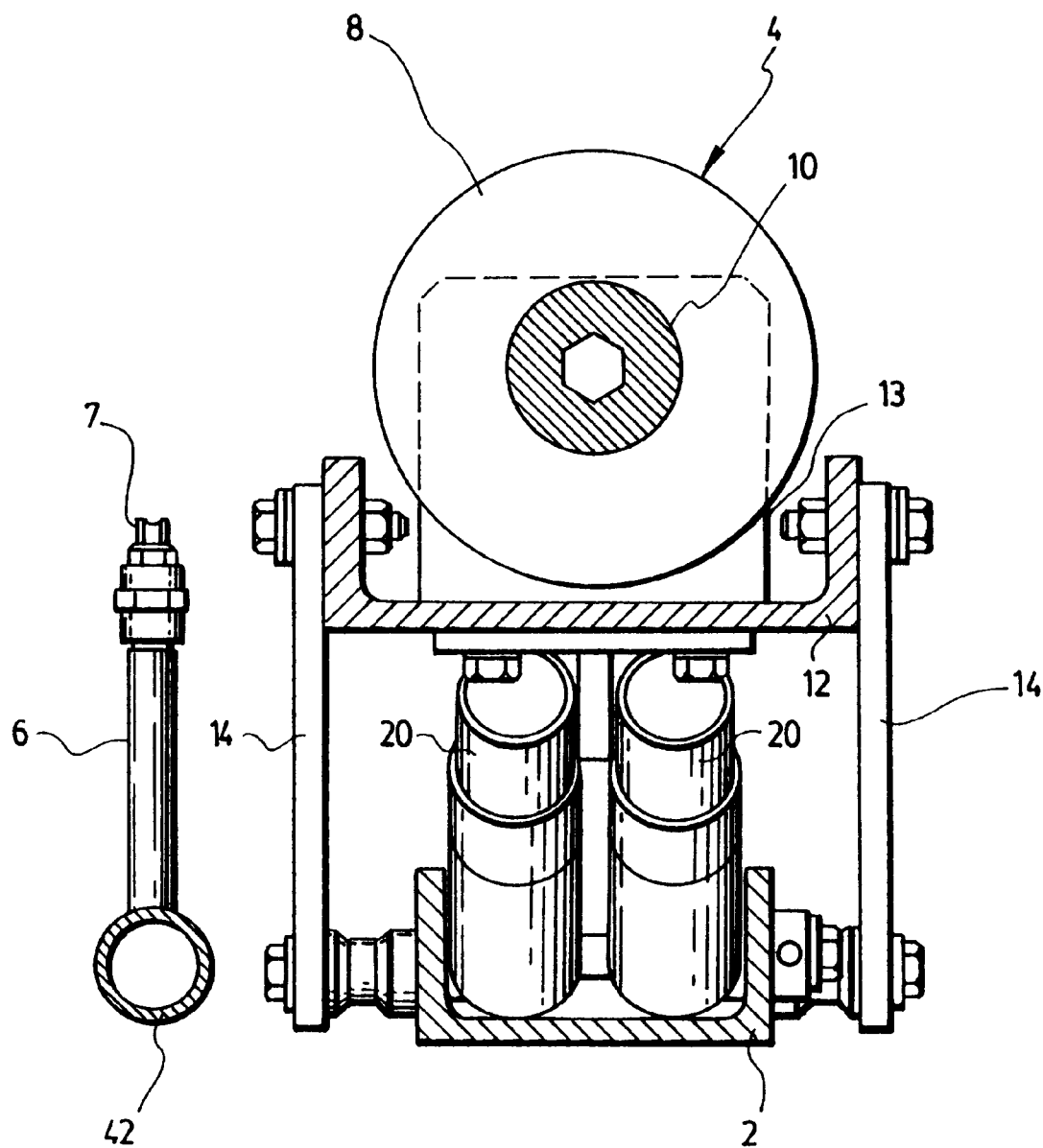
FIG. 4 is a cross-section view along the lines 4—4 of the apparatus illustrated in FIG. 1.
Figure 5:
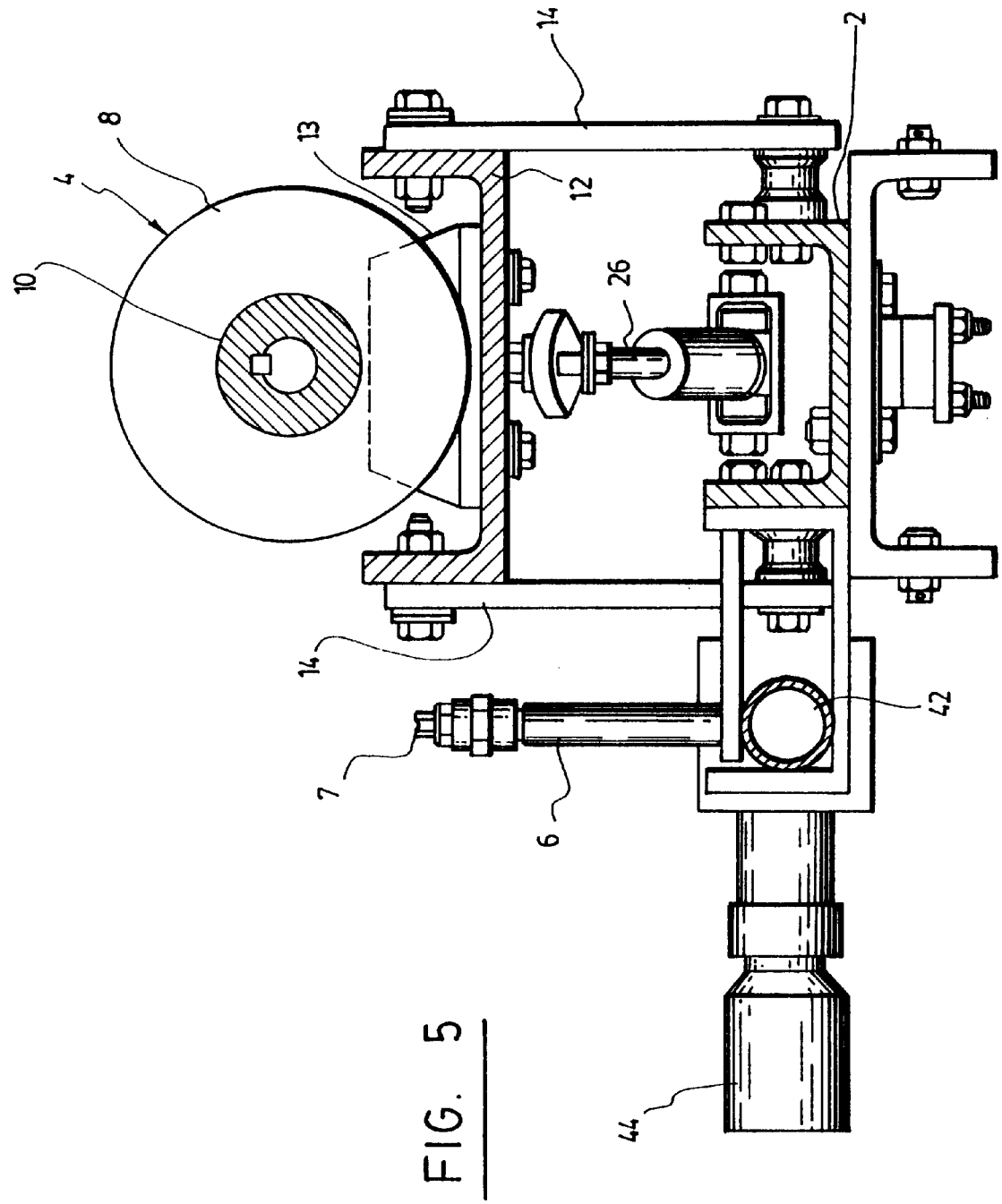
FIG. 5 is a cross-section view along the lines 5—5 of the apparatus illustrated in FIG. 1.

The brush 4 can be advantageously formed of a set of brushes 8 having rotary shafts 10 coaxially aligned, positioned solidly end to end, and mounted onto an elongated platform 12 connected to the frame 2 by means of pairs of arms 14 on both sides of the platform 12 (as shown in FIGS. 3–5). The alignment and assembly of the rotary shafts 10 can be carried out by means of bearing members 13 mounted onto the platform 12 between the brushes 8 and on both ends, so that the brush 4 extends generally in parallel with respect to the portion 39 of the stator 38 to be cleaned when the frame 2 is mounted onto the rotor 28 as shown in FIG. 2. The brush 4 forms a simple and efficient brushing element that provides the desired brushing effects. However, this does not prevent the use of more complex brushing elements, like a vibrating brush mechanism.

The shaft 10 of one of the end brushes 8 is coupled to a motor 16 apt to drive them in rotation at the desired speed. The motor 16 is preferably mounted onto the platform 12 so as to move therewith. The motor 16 can be advantageously of a variable speed pneumatic type, and in such a case be then provided with a compressed air inlet 18 connectable to a compressed air line (not shown in the Figures).

Referring to FIGS. 1 and 4, the ends of the arms 14 are pivotally secured to the platform 12 and to the frame 2 respectively, thereby permitting a longitudinal displacement of the platform 12 with respect to the frame 2 at the same time as a movement of the platform 12 away or closer with respect to the frame 2. To that purpose, a pair of parallel jacks 20 (one of which is hidden by the one that is visible in FIG. 1) are positioned transversely between the platform 12 and the frame 2 and directed at an angle to exert actions following the direction of displacement of the platform 12 with respect to the frame 2, represented by the arrow 13, controlled by the pairs of parallel arms 14. Thus, the platform 12 moves obliquely with respect to the frame 2 according to the trajectory of the displacement permitted by the arms 14, which allows the positioning of the brush 4 with respect to the frame 2 so that the brush 4 comes in contact with the portion 39 of the stator 38 to be cleaned when the frame 2 is mounted onto the rotor 28 as illustrated in FIG. 2.

Referring to FIGS. 1 and 3, in the case where the jacks 20 are of a simple action pneumatic type, return springs 22 can be mounted between the frame 2 and the platform 12 to exert a force seeking to bring the platform 12 closer towards the frame 2 to bring it back in retracted position. The return springs 22 can be positioned longitudinally and directed at an angle between the platform 12 and the frame 2 so as to exert return actions following the trajectory of displacement of the platform 12 with respect to the frame 2, controlled by the pairs of arms 14. The jacks 20 are connected to a compressed air line 24. A single jack could also be used instead of two, provided that it is apt to develop the required force to move the platform 12 and the brush 4.

Referring to FIGS. 1 and 5, to prevent the jacks 20 from pushing the platform 12 too far away from the frame 2, a restricting or stop mechanism 26 having telescopic arms can be installed between the platform 12 and the frame 2 in order to limit the distance in respect of which the platform 12 can move away from the frame 2.

Referring to FIG. 2, the apparatus is devised to be installed in place of a pole 29 removed beforehand from the rotor 28, without the rotor 28 itself being removed from the turbine-alternator group subjected to the cleaning. To this effect, the frame 2 is provided with attachments 30 designed to be inserted and slid in a keyway 32 normally intended to receive and retain a pole 29 of the rotor 28. Unlike the poles 29 that are generally weld to the keyways given the stress that they must withstand when the turbine-alternator group is in operation, the apparatus generally needs only to be bolted to the rotor 28. or locked in the keyway 32 by any suitable means to maintain it in place at the desired height, or even simply left resting when the rotor 28 exhibits a suitable bearing point. For example, the frame 2 can be provided with a locking mechanism 34 actuated by a screw 36 as shown in FIG. 1, and operating to move the top attachment 30 towards the frame 2 in order to cause a clamping of the frame 2 against the keyway 32. Of course, other securing or blocking elements can be used insofar as they suit the model of the pieces used to attach the poles 29 on the rotor 28. Once in place, as shown in FIG. 2, the apparatus extends along the height of the rotor 28 and thereby faces the magnetic circuit 39 of the stator 38 to be cleaned. The apparatus then only has to be switched on while causing the rotor 28 to turn slowly in order to cover the entire contour of the stator 38. The length and the number of brushes 8 of the apparatus are chosen according to the height of the stator 38 to be cleaned.

Referring to FIGS. 1 and 2, the injectors 6 are mounted longitudinally onto the frame 2 and project on one side of the brush 4. Alternatively, the injectors 6 can be mounted onto the platform 12 instead of the frame 2. The injectors 6 are preferably positioned at a generally regular distance from each other on the side of the frame 2 and their nozzles 7 are directed opposite to the frame 2, frontwards, in order to spray uniformly the solvent on the magnetic a circuit 39 of the stator 38. Thus, in use and when the rotor 28 turns in the proper direction as represented by the arrow 40, the action of spraying the solvent is achieved just before the brushing for a more efficient cleaning. The injectors 6 communicate with a common solvent supply line 42 (partially represented by the dashed lines in FIG. 1) extending longitudinally with respect to the frame 2 and provided with an inlet 44 intended to be connected to a solvent tank via an appropriate line (not shown). The conveying of the solvent in the line from the tank to the injectors 6 can be carried out using a pump and a solvent pressure regulating device (not shown). A plastic tank of 200 liters and a piston pump can for example suit these functions. Of course, a series of individual lines connecting the injectors 6 to the tank can equally be used as well.

Referring to FIG. 2, once the apparatus is in place onto the rotor 28, the motor 16 and the injectors 6 are connected to the respective devices for the actuating of the brushes 8 and the spraying of the solvent. In operation, the cleaning is achieved by causing the rotor 28 to rotate slowly, by spraying the solvent along the height of the magnetic circuit 39 of the stator 38 by means of the injectors 6, and by brushing the magnetic circuit 39 along all its height by means of the brushes 8, while controlling the pressure of the brushes 8 against the surface of the magnetic circuit 39 of the stator 38 by means of the jacks 20 (illustrated in FIG. 1). Preferably, the pressure of the brushes 8 against the surface of the magnetic circuit is adjusted at the same time as the brushes 8 turn, so that the brushes 8 always exert the same pressure on the magnetic circuit 39. Preferably, the rotor 28 is rotated manually according to a preestablished method, for example by means of a motorized and geared down driving mechanism (not shown) given the important mass of the rotor 28 to be rotated, while taking care to remove beforehand the security brake of the rotor 28. It is preferable to respect a slow and constant rotation speed of the rotor 28 for a more efficient cleaning.

Preferably, a powerful ventilation system and a propylene tarpaulin will be set in place to retrieve the dirt on the alternator floor.

By means of the apparatus and the cleaning method according to the invention, the forced stop delay for the turbine-alternator group can be reduced to about 6 weeks.

While embodiments of this invention have been illustrated in the accompanying drawings and described above, it will be evident to those skilled in the art that changes and modifications may be made therein without departing from the essence of this invention. All such modifications or variations are believed to be within the scope of the invention as defined by the claims appended hereto.

What is claimed is:

1. An apparatus for cleaning a stator portion facing a rotor with removable peripheral poles in a turbine-alternator group, comprising:

an elongated frame, adapted to replace one of the poles of the rotor;

fastening means for fastening the frame onto the rotor in place of said one of the poles of the rotor;

an elongated brushing element, extending generally in parallel with respect to the stator portion to be cleaned when the frame is mounted onto the rotor;

positioning means mounted between the frame and the brushing element, for positioning the brushing element with respect to the frame so that the brushing element comes in contact with the stator portion to be cleaned when the frame is mounted onto the rotor;

a driving motor coupled to the brushing element; and injection means for injecting a fluid under pressure on the stator portion to be cleaned when the frame is mounted onto the rotor.

2. The apparatus according to claim 1, wherein the elongated brushing element comprises a series of coaxially aligned rotary brushes coupled together.

3. The apparatus according to claim 1, wherein the positioning means comprise:

an elongated platform provided with spaced apart supports rotatably supporting the brushing element over the platform;

pairs of parallel arms pivotally mounted between the platform and the frame, so that the platform moves longitudinally with respect to the frame when the platform moves away from the frame; and at least one jack mounted between the platform and the frame.

4. The apparatus according to claim 3, wherein the motor comprises a compressed air rotary motor mounted onto the platform.

5. The apparatus according to claim 3, wherein said at least one jack comprises two parallel pneumatic jacks positioned transversely and directed at an angle between the platform and the frame to exert actions following a direction of displacement of the platform with respect to the frame, controlled by the pairs of parallel arms.

6. The apparatus according to claim 5, wherein the positioning means further comprise:

return means mounted between the platform and the frame for exerting a force seeking to move the platform closer towards the frame; and a restricting element mounted between the platform and the frame to limit the moving away of the platform with respect to the frame.

7. The apparatus according to claim 6, wherein the return means comprise return springs positioned longitudinally and directed at an angle between the platform and the frame to exert return actions following a direction of displacement of the platform with respect to the frame, controlled by the pairs of parallel arms.

8. The apparatus according to claim 1, wherein the fastening means comprise:

T-shaped attachments mounted on one side of the frame opposite the brushing element, the attachments being adapted to slide in a keyway intended for one of the poles of the rotor; and locking means operating for moving at least one of the attachments closer towards the frame to exert a clamping of the frame against the keyway.

9. The apparatus according to claim 1, wherein the injection means comprise a series of injectors mounted longitudinally onto the frame and projecting on one side of the brushing element.

10. The apparatus according to claim 2, wherein:

the positioning means comprise: an elongated platform provided with spaced apart supports rotatably supporting the brushing element above the platform; pairs of parallel arms pivotally mounted between the platform and the frame, so that the platform moves longitudinally with respect to the frame when the platform moves away from the frame; and two parallel pneumatic jacks positioned transversely and directed at an angle between the platform and the frame to exert actions following a direction of displacement of the platform with respect to the frame, controlled by the pairs of parallel arms; return springs mounted longitudinally between the platform and the frame for exerting a force seeking to move the platform closer towards the frame, the return springs being directed at an angle between the platform and the frame to exert return actions following a direction of displacement of the platform with respect to the frame, controlled by the pairs of parallel arms; and a restricting element mounted between the platform and the frame to limit the moving away of the platform with respect to the frame;

the motor comprises a compressed air rotary motor mounted onto the platform;

the fastening means comprise: T-shaped attachments mounted on one side of the frame opposite the brushing element, the attachments being adapted to slide in a keyway intended for one of the poles of the rotor; and locking means operating for moving at least one of the attachments closer towards the frame to exert a clamping of the frame against the keyway; and the injection means comprise a series of injectors mounted longitudinally onto the frame and projecting on one side of the brushing element.

11. A Method of cleaning a stator portion facing a rotor with removable peripheral poles in a turbine-alternator group, comprising the steps of:

a) substituting at the place of a pole of the rotor, a cleaning apparatus comprising: an elongated frame, adapted to replace said pole of the rotor; fastening means for fastening the frame on the rotor in place of said pole of the rotor; an elongated brushing element, extending generally in parallel with respect to the stator portion to be cleaned when the frame is mounted onto the rotor; positioning means mounted between the frame and the brushing element, for positioning the brushing element with respect to the frame so that the brushing element comes in contact with the stator portion to be cleaned when the frame is mounted onto the rotor; a driving motor coupled to the brushing element; and injection means for injecting a fluid under pressure on the stator portion to be cleaned when the frame is mounted onto the rotor;

b) activating the motor, supplying the injection means with a fluid under pressure; and c) turning slowly the rotor so that the rotor makes at least one complete revolution.

12. The method of cleaning according to claim 11, comprising the step of decoupling the rotor from the turbine before carrying out the steps a) to c).

13. The method of cleaning according to claim 11, wherein the brushing element is positioned to exert a constant pressure against the stator portion to be cleaned during the complete revolution of the rotor.

* * * * *